US012668459B2

(12) United States Patent
Zhao et al.

(10) Patent No.: US 12,668,459 B2
(45) Date of Patent: Jun. 30, 2026

(54) ESCALATOR MODULE AND ESCALATOR

(71) Applicant: KONE Corporation, Helsinki (FI)

(72) Inventors: Yun Zhao, Helsinki (FI); Martin Norpoth, Helsinki (FI); Jiesong Jiang, Helsinki (FI)

(73) Assignee: KONE CORPORATION, Helsinki (FI)

( * ) Notice: Subject to any disclaimer, the term of this patent is extended or adjusted under 35 U.S.C. 154(b) by 77 days.

(21) Appl. No.: 18/771,720

(22) Filed: Jul. 12, 2024

(65) Prior Publication Data

US 2025/0026614 A1 Jan. 23, 2025

(30) Foreign Application Priority Data

Jul. 21, 2023 (CN) ........................ 202310898930.2

(51) Int. Cl.

| | |
|---|---|
| ***B66B 23/00*** | (2006.01) |
| ***B66B 21/02*** | (2006.01) |
| ***B66B 21/04*** | (2006.01) |
| ***B66B 23/04*** | (2006.01) |
| ***B66B 23/14*** | (2006.01) |

(52) U.S. Cl.

CPC ............ *B66B 23/145* (2013.01); *B66B 21/04* (2013.01); *B66B 23/04* (2013.01)

(58) Field of Classification Search

None

See application file for complete search history.

(56) References Cited

U.S. PATENT DOCUMENTS

| | | | | |
|---|---|---|---|---|
| 6,685,002 B1 * | 2/2004 | Nurnberg | B66B 23/00 | 198/321 |
| 2006/0096834 A1 * | 5/2006 | Illedits | B66B 29/06 | 198/325 |
| 2007/0000753 A1 * | 1/2007 | Hame | B66B 25/00 | 198/323 |
| 2007/0029163 A1 * | 2/2007 | Aulanko | B66B 23/04 | 198/335 |
| 2011/0024262 A1 * | 2/2011 | Nurnberg | B66B 23/026 | 474/148 |
| 2013/0228417 A1 * | 9/2013 | Tautz | B66B 29/005 | 198/464.4 |
| 2014/0202827 A1 * | 7/2014 | Fan Jin Quan | B66B 23/00 | 198/322 |

FOREIGN PATENT DOCUMENTS

DE 102004001519 A1 * 8/2005 ............. B66B 21/00

* cited by examiner

*Primary Examiner* — Gene O Crawford
*Assistant Examiner* — Muhammad Awais
(74) *Attorney, Agent, or Firm* — Birch, Stewart, Kolasch & Birch, LLP

(57) ABSTRACT

An escalator module and an escalator are provided. The escalator module includes a multifunctional connecting bracket, and a guide wheel assembly including a guide wheel support plate and a plurality of guide wheels. The plurality of guide wheels are connected to the guide wheel support plate, and the guide wheel support plate is connected to the multifunctional connecting bracket, and the multifunctional connecting bracket does not exceed the guide wheel assembly in a transverse direction, so that the escalator module at least includes, at the maximum dimension in the transverse direction, the guide wheel assembly.

20 Claims, 3 Drawing Sheets

ESCALATOR MODULE AND ESCALATOR

TECHNICAL FIELD

The invention relates to an escalator module and an escalator comprising the escalator module.

BACKGROUND

Escalator has become a necessary transportation equipment for different floors in modern city life. With the update and development of escalator technology, the old escalator needs to be eliminated and the modern escalator solution should be used.

Usually, when the old escalator is renovated, the old escalator parts are removed, but the truss of the escalator is kept. Then, the technicians install new escalator components on site, such as the upper escalator module and the lower escalator module.

However, due to the limited space frame of the place where the escalator was originally installed, the renovation of the escalator and the installation of its equipment are inevitably limited. For example, the width of the old truss in the transverse direction is narrow, which can not accommodate the conventional escalator module.

Therefore, in practice, it is expected to provide an escalator module, which has a smaller size in the transverse direction, a compact structure and a high degree of integration, and can adapt to the modernization application of narrow truss escalators.

SUMMARY

In view of the problems and demands mentioned above, the present invention provides an escalator module and an escalator including the escalator module, which solve the above problems and bring other technical effects by adopting the following technical features.

According to one aspect of the present disclosure, an escalator module is provided, which comprises a multifunctional connecting bracket, and a guide wheel assembly comprising a guide wheel support plate and a plurality of guide wheels, wherein the plurality of guide wheels are connected to the guide wheel support plate, and the guide wheel support plate is connected to the multifunctional connecting bracket, and the multifunctional connecting bracket does not exceed the guide wheel assembly in a transverse direction, so that the escalator module at least comprises, at the maximum dimension in the transverse direction, the guide wheel assembly.

The guide wheel assembly, also known as the guide wheel assembly of handrail belt, is used to guide the movement of handrail belt along the handrail belt drive wheel. The guide wheel assembly is an important component of the escalator module, which is usually installed inside the multifunctional connecting plate, so the multifunctional connecting plate is farther outside than the guide wheel assembly.

However, as for the modernization of the escalator with narrow truss, the dimension in the transverse direction is narrower, so the traditional connection mode of multifunctional connecting plate and guide wheel assembly cannot be installed on the narrow truss.

According to the above features of the present disclosure, the original multi-functional connecting plate is optimized, and the new multi-functional connecting bracket is arranged not to exceed the guide wheel assembly in the transverse direction, so that the escalator module at least includes, at the maximum dimension in the transverse direction, the guide wheel assembly, thereby reducing the width of the escalator module in the transverse direction.

In some examples, in the transverse direction, the guide wheel support plate is arranged on the outer side relative to the multifunctional connecting bracket, and the plurality of guide wheels are arranged on the inner side of the guide wheel support plate toward the multifunctional connecting bracket.

In some examples, the guide wheel support plate is substantially perpendicular to the transverse direction.

In some examples, the multifunctional connecting bracket includes a first bracket along the horizontal direction and a second bracket inclined relative to the horizontal direction, and the guide wheel support plate is connected to the first bracket and the second bracket respectively.

In some examples, in the transverse direction, the plurality of guide wheels are arranged on the same plane or on the outer side, relative to the multifunctional connecting bracket, and the guide wheel support plate is arranged on the inner side of the plurality of guide wheels toward the multifunctional connecting bracket.

In some examples, at least one of the plurality of guide wheels is directly connected to the multifunctional connecting bracket.

In some examples, the escalator module further comprises a spindle assembly, and the guide wheel assembly and the outer edge of the spindle assembly are substantially in the same plane in the transverse direction.

In some examples, the escalator module further comprises a handrail belt drive assembly, and the guide wheel assembly and the outer edge of the handrail belt drive assembly are substantially in the same plane in the transverse direction.

In some examples, the escalator module is an upper escalator module and/or a lower escalator module of an escalator.

On the other hand, the present disclosure provides an escalator, which comprises a truss and an escalator module as mentioned above connected to the truss.

According to the technical scheme of the present disclosure, the guide wheel assembly is installed on the multifunctional connecting bracket, and the multifunctional connecting bracket does not exceed the guide wheel assembly in the transverse direction, so that the escalator module at least includes, at the maximum dimension in the transverse direction, the guide wheel assembly. Thus the escalator module has a smaller dimension in the transverse direction, has a compact structure and a high integration, and can adapt to the modernization application of the escalator with a narrow truss.

DETAILED DESCRIPTION

Figure 1:
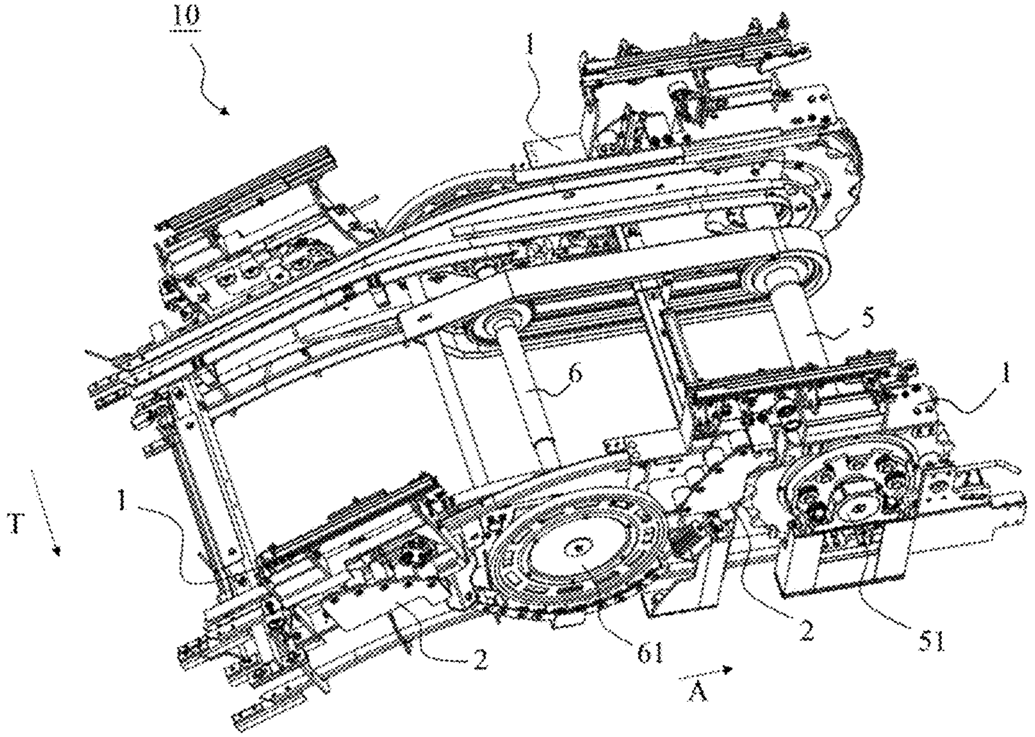
FIG. 1 shows a perspective view of an escalator module according to at least one embodiment of the present disclosure, wherein the escalator module is an upper escalator module.

In order to make the purpose, technical scheme and advantages of the technical scheme of the present disclosure more clear, the technical scheme of the embodiment of the present disclosure will be described clearly and completely with the drawings of specific embodiments of the present disclosure. Like reference numerals in the drawings represent like parts. It should be noted that the described embodiment is a part of the embodiment of the present disclosure, not the whole embodiment. Based on the described embodiments of the present disclosure, all other embodiments obtained by ordinary people in the field without creative labor belong to the scope of protection of the present disclosure.

Unless otherwise defined, technical terms or scientific terms used herein shall have their ordinary meanings as understood by people with ordinary skills in the field to which this disclosure belongs. The words “first”, “second” and similar words used in the specification and claims of the patent application of this disclosure do not indicate any order, quantity or importance, but are only used to distinguish different components. Similarly, similar words such as “a” or “an” do not necessarily mean quantitative restrictions. Similar words such as “including” or “containing” mean that the elements or objects appearing before the word cover the elements or objects listed after the word and their equivalents, without excluding other elements or objects. Similar words such as “connected” or “connected” are not limited to physical or mechanical connection, but can include electrical connection, whether direct or indirect. “Up”, “Down”, “Left” and “Right” are only used to indicate the relative positional relationship. When the absolute position of the described object changes, the relative positional relationship may also change accordingly.

The escalator is provided with a circulating ladder path to transport people. In recent years, according to the needs of development, escalators in shopping malls, stations and airports are being reformed in terms of escalator performance and energy saving, and the old escalators are renovated. Usually, when the old escalator is renovated, the old escalator parts are removed, but the truss of the escalator is kept. Then, the technicians install new escalator components, such as the upper escalator module and the lower escalator module, on site.

For modern escalators, trusses and escalator modules are usually assembled in advance in the factory and installed directly at the site. However, for the old escalator reconstruction project, because the space frame of the original escalator installation site has been limited, new escalator modules can only be installed on the existing truss. For some old trusses, the width in the transverse direction is narrow, which can not accommodate the conventional escalator module.

Multifunctional connecting bracket, also known as multifunctional connecting plate or multifunctional interface plate, usually needs to be connected with the truss in the prior art for connecting functional components (such as guide wheel assembly, comb plate, skirt plate, cover plate or entrance panel) to the truss.

Aiming at the defects of the prior art, the present disclosure provides an escalator module and an escalator including the escalator module. Hereinafter, preferred embodiments of an escalator module and an escalator according to the present disclosure will be described in detail with reference to the drawings. Compared with the embodiment shown in the drawings, the feasible embodiments within the protection scope of this disclosure may have fewer components, other components not shown in the drawings, different components, components arranged differently or components connected differently, etc. Furthermore, two or more components in the drawings may be implemented in a single component or a single component shown in the drawings may be implemented as a plurality of separate components without departing from the concept of the present disclosure.

It should be noted that, in order to simplify the description, the embodiment of this disclosure will highlight the main components of the pre-assembled escalator module, and omit the description of other conventional components in the escalator, including but not limited to: truss, step ladder, comb plate, skirt plate, cover plate, entrance panel, etc.

FIGS. 1 to 4 exemplarily show perspective views of an escalator module according to at least one embodiment of the present disclosure, in which the escalator module is an upper escalator module.

Figure 2:
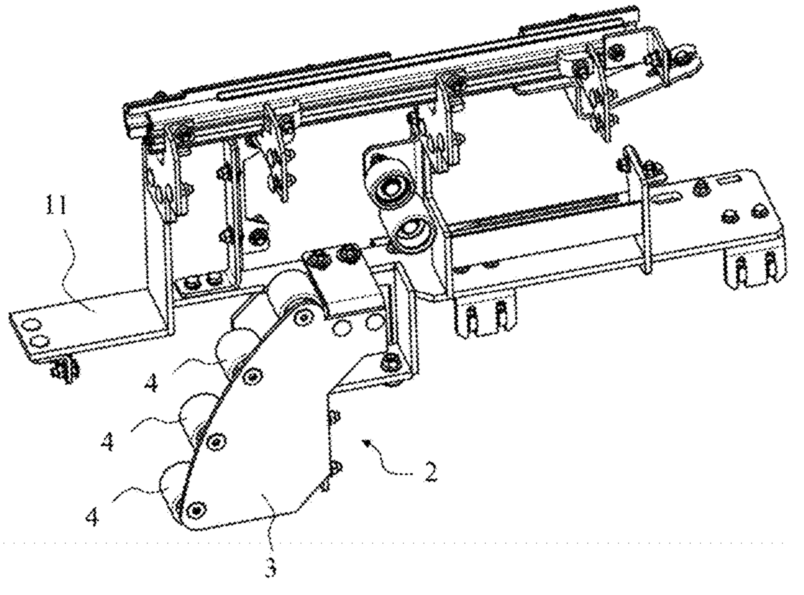
FIG. 2 shows a schematic diagram of a first bracket of a multifunctional connecting bracket according to at least one embodiment of the present disclosure.

As shown in FIGS. 1 and 2, an escalator module 10 according to at least one embodiment of the present disclosure includes a multifunctional connecting bracket 1, a guide wheel assembly 2, a spindle assembly 5 and a handrail belt drive assembly 6. The guide wheel assembly 2 includes a guide wheel support plate 3 and a plurality of guide wheels 4 connected to the guide wheel support plate 3, and the guide wheel support plate 3 is connected to the multifunctional connecting bracket 1.

In this embodiment, the guide wheel support plate 3 is substantially perpendicular to a transverse direction T, and a plurality of guide wheels 4 are installed perpendicular to the guide wheel support plate 3, so they are substantially parallel to the transverse direction T. The transverse direction T is perpendicular to the running direction of the steps, so the dimension in the transverse direction T defines the width of the escalator module 10.

The spindle assembly 5 and the handrail belt drive assembly 6 are generally parallel to the transverse direction T and parallel to each other. The spindle assembly 5 is used to drive the sprocket wheel of the step, so as to drive the cyclic movement of the step. The handrail belt drive assembly 6 is in transmission connection with the spindle assembly 5 through a transmission belt for driving the handrail to move.

The multifunctional connecting bracket 1 does not exceed the guide wheel assembly 2 in the transverse direction T, so that the escalator module 10 at least includes, at the maximum dimension $L_{max}$ in the transverse direction T, the guide wheel assembly 2. Specifically, in this embodiment, in the transverse direction T, the guide wheel support plate 3 is arranged on the outer side relative to the multifunctional connecting bracket 1, and a plurality of guide wheels 4 are arranged on the inner side of the guide wheel support plate 3 toward the multifunctional connecting bracket 1.

It should be noted that the “inner side” and “outer side” referred to in this disclosure are opposite sides in the transverse direction T.

Figure 4:
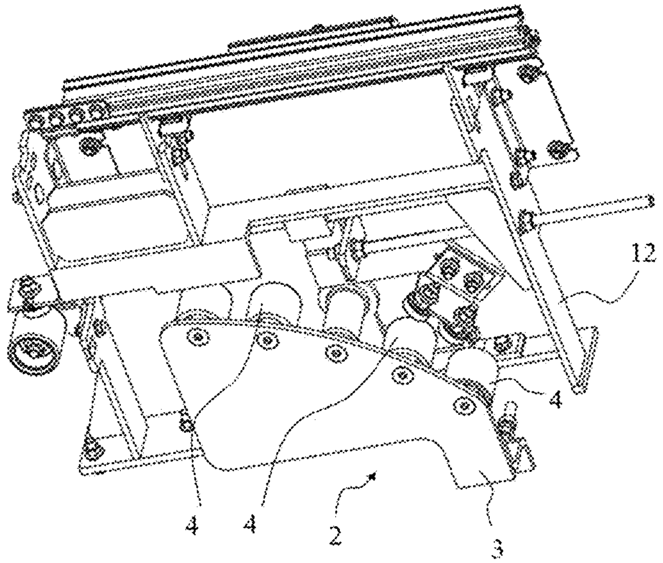
FIG. 4 shows a schematic diagram of a second bracket of the multifunctional connecting bracket according to at least one embodiment of the present disclosure.

In the embodiment of the upper escalator module, the multifunctional connecting bracket 1 may include a first bracket 11 along the horizontal direction and a second bracket 12 inclined relative to the horizontal direction. The first bracket 11 and the second bracket 12 are respectively arranged at both sides of the handrail belt drive assembly 6. FIG. 2 shows the first bracket 11 and the guide wheel assembly 2 connected therewith, and FIG. 4 shows the second bracket 12 and the guide wheel assembly 2 connected therewith. The guide wheel support plate 3 is connected to the first bracket 11 and the second bracket 12, respectively, for example, by angle iron. The plurality of guide wheels 4 are configured to support and guide the movement of the handrail belt.

Figure 3:
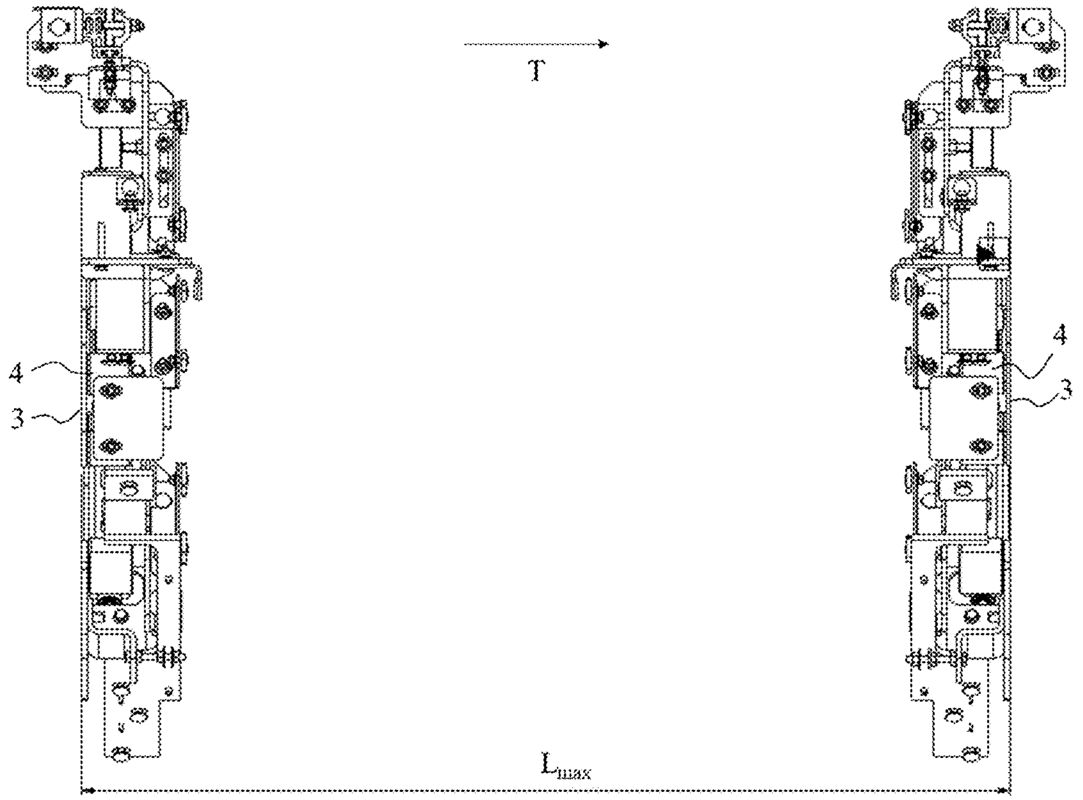
FIG. 3 shows a partial front view of the escalator module shown in FIG. 1.

FIG. 3 shows a partial front view to the right from the position A of FIG. 1. In this embodiment, in the transverse direction T, the guide wheel assembly 2, in particular the guide wheel support plate 3 located at the outermost side and the outer edge 51 of the spindle assembly 5 are substantially in the same plane. At the same time, the guide wheel support plate 3 and the outer edge 61 of the handrail belt drive assembly 6 are also substantially in the same plane. Therefore, the escalator module 10 includes, at the maximum dimension $L_{max}$ in the transverse direction T, the guide wheel support plate 3, the spindle assembly 5 and the handrail belt drive assembly 6.

It should be noted that the uppermost part of FIG. 3 is an additional connecting profile piece of the multifunctional connecting bracket 1, which is used to connect functional components such as skirt plate, cover plate, entrance panel, etc. Since these components are not directly connected to the truss, the sizes thereof in the transverse direction T does not affect the installation of the escalator module to the truss, so they can be larger than $L_{max}$ without affecting the concept of this disclosure.

Figure 5:
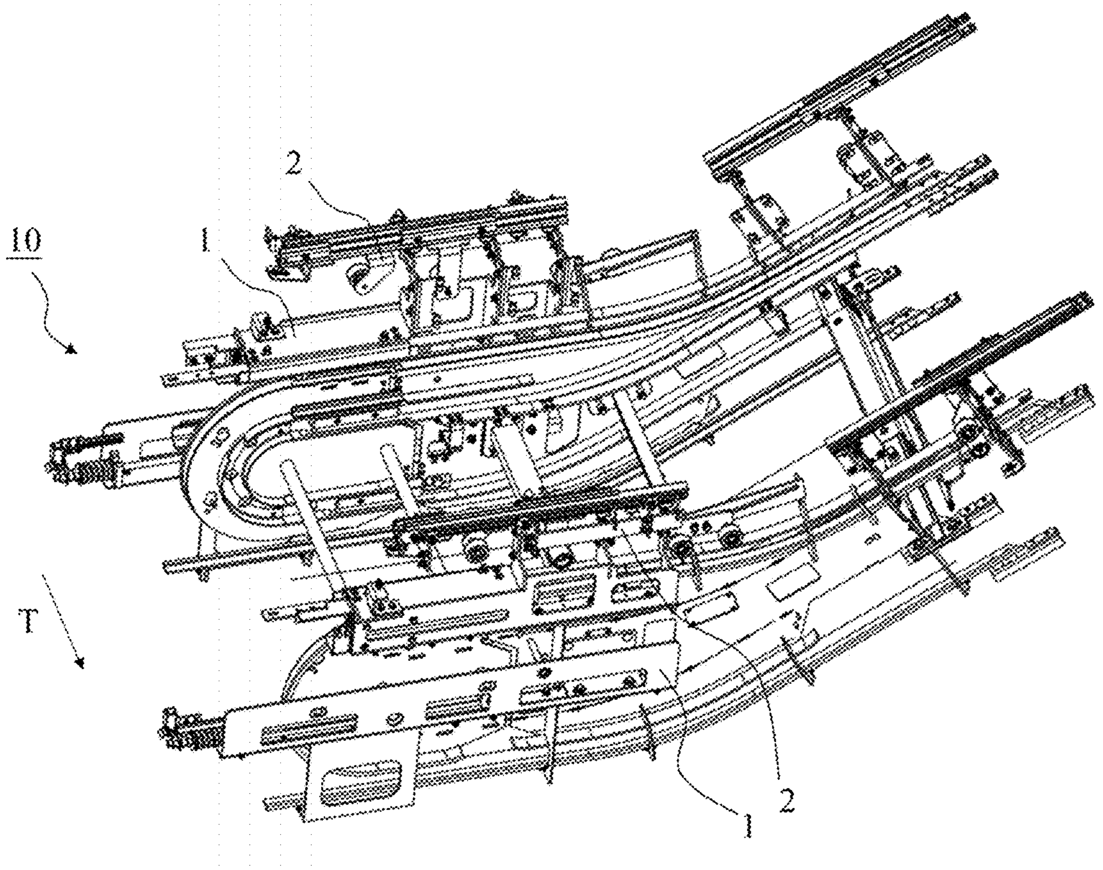
FIG. 5 shows a perspective view of an escalator module according to at least one embodiment of the present disclosure, wherein the escalator module is a lower escalator module.
Figure 6:
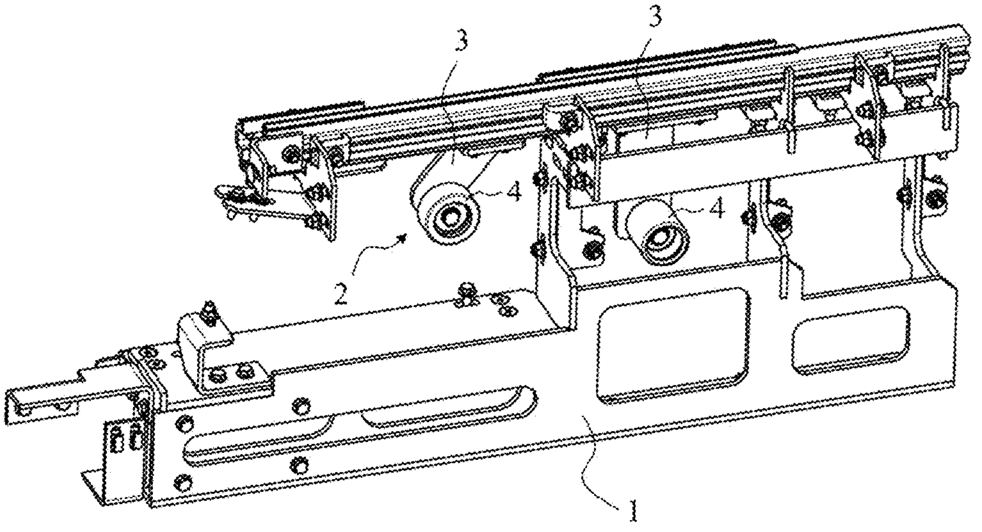
FIG. 6 shows a schematic diagram of a multifunctional connecting bracket according to at least one embodiment of the present disclosure.

FIGS. 5 and 6 exemplarily show perspective views of an escalator module according to another embodiment of the present disclosure, in which the escalator module is a lower escalator module.

In this embodiment, different from the previous embodiment, in the transverse direction T, a plurality of guide wheels 4 are arranged on the same plane or on the outer side, relative to the multifunctional connecting bracket 1, and the guide wheel support plate 3 is arranged on the inner side of the guide wheels 4 toward the multifunctional connecting bracket 1. As shown in FIG. 6, at least one of the plurality of guide wheels 4 may be directly connected to the multifunctional connecting bracket 1, or may be connected to the multifunctional connecting bracket 1 through a guide wheel support plate 3.

Therefore, in this embodiment, therefore, the escalator module 10 includes, at the maximum dimension $L_{max}$ in the transverse direction T, the guide wheel 4 and the multifunctional connecting bracket 1.

On the other hand, the disclosure also provides an escalator, which comprises a truss and the escalator module 10 as mentioned above, and the escalator module 10 is connected to the truss. The escalator can be, for example, an escalator modernized from an old escalator.

To sum up, the embodiments shown in this disclosure exemplarily show that the multifunctional connecting bracket is arranged in the transverse direction and does not exceed the guide wheel assembly, so that the escalator module at least includes, at the largest dimension in the transverse direction, the guide wheel assembly, thereby reducing the width of the escalator module in the transverse direction. The escalator module and escalator adopting these technical schemes have compact structures and high integration, and can adapt to the modernization application of the escalator with narrow truss.

In this paper, the exemplary embodiments of the escalator module and escalator of the present invention are described in detail with reference to the preferred embodiments. However, it can be understood by those skilled in the art that various variations and modifications can be made to the above specific embodiments without departing from the concept of the present invention, and various technical features and structures proposed by the present invention can be combined in various ways without exceeding the protection scope of the present invention. For example, the installation methods of the guide wheel assemblies of the upper escalator module and the lower escalator module can be interchanged. The scope of protection of the present invention is determined by the appended claims.

The invention claimed is:

1. An escalator module, comprising:

a multifunctional connecting bracket; and a guide wheel assembly comprising a guide wheel support plate and a plurality of guide wheels, wherein the plurality of guide wheels are connected to the guide wheel support plate, and the guide wheel support plate is connected to the multifunctional connecting bracket, and the multifunctional connecting bracket does not exceed the guide wheel assembly in a transverse direction so that the escalator module at least includes, at a maximum dimension in the transverse direction, the guide wheel assembly.

2. The escalator module according to claim 1, wherein, in the transverse direction, the guide wheel support plate is arranged on an outer side relative to the multifunctional connecting bracket, and the plurality of guide wheels are arranged on an inner side of the guide wheel support plate toward the multifunctional connecting bracket.

3. The escalator module according to claim 2, wherein the guide wheel support plate is substantially perpendicular to the transverse direction.

4. The escalator module according to claim 1, wherein the multifunctional connecting bracket comprises a first bracket along a horizontal direction and a second bracket inclined relative to the horizontal direction, and the guide wheel support plate is connected to the first bracket and the second bracket, respectively.

5. The escalator module according to claim 1, wherein, in the transverse direction, the plurality of guide wheels are arranged on a same plane or on an outer side, relative to the multifunctional connecting bracket, and the guide wheel support plate is arranged on an inner side of the plurality of guide wheels toward the multifunctional connecting bracket.

6. The escalator module according to claim 5, wherein at least one of the plurality of guide wheels is directly connected to the multifunctional connecting bracket.

7. The escalator module according to claim 1, wherein the escalator module further comprises a spindle assembly, and the guide wheel assembly and an outer edge of the spindle assembly are substantially in a same plane in the transverse direction.

8. The escalator module according to claim 1, wherein the escalator module further comprises a handrail belt drive assembly, and the guide wheel assembly and an outer edge of the handrail belt drive assembly are substantially in a same plane in the transverse direction.

9. The escalator module according to claim 1, wherein the escalator module is an upper escalator module and/or a lower escalator module.

10. An escalator comprising a truss and the escalator module according to claim 1, wherein the escalator module is connected to the truss.

11. The escalator module according to claim 2, wherein the escalator module further comprises a spindle assembly, and the guide wheel assembly and an outer edge of the spindle assembly are substantially in a same plane in the transverse direction.

12. The escalator module according to claim 3, wherein the escalator module further comprises a spindle assembly, and the guide wheel assembly and an outer edge of the spindle assembly are substantially in a same plane in the transverse direction.

13. The escalator module according to claim 4, wherein the escalator module further comprises a spindle assembly, and the guide wheel assembly and an outer edge of the spindle assembly are substantially in a same plane in the transverse direction.

14. The escalator module according to claim 5, wherein the escalator module further comprises a spindle assembly, and the guide wheel assembly and an outer edge of the spindle assembly are substantially in a same plane in the transverse direction.

15. The escalator module according to claim 6, wherein the escalator module further comprises a spindle assembly, and the guide wheel assembly and an outer edge of the spindle assembly are substantially in a same plane in the transverse direction.

16. The escalator module according to claim 2, wherein the escalator module further comprises a handrail belt drive assembly, and the guide wheel assembly and an outer edge of the handrail belt drive assembly are substantially in a same plane in the transverse direction.

17. The escalator module according to claim 3, wherein the escalator module further comprises a handrail belt drive assembly, and the guide wheel assembly and an outer edge of the handrail belt drive assembly are substantially in a same plane in the transverse direction.

18. The escalator module according to claim 4, wherein the escalator module further comprises a handrail belt drive assembly, and the guide wheel assembly and an outer edge of the handrail belt drive assembly are substantially in a same plane in the transverse direction.

19. The escalator module according to claim 5, wherein the escalator module further comprises a handrail belt drive assembly, and the guide wheel assembly and an outer edge of the handrail belt drive assembly are substantially in a same plane in the transverse direction.

20. The escalator module according to claim 6, wherein the escalator module further comprises a handrail belt drive assembly, and the guide wheel assembly and an outer edge of the handrail belt drive assembly are substantially in a same plane in the transverse direction.

* * * * *